June 26, 1934.  H. E. IVES  1,964,580

SCANNING APPARATUS

Filed May 29, 1931  2 Sheets-Sheet 1

INVENTOR
H. E. IVES
BY
Stanley B. Kent
ATTORNEY

June 26, 1934.     H. E. IVES     1,964,580
SCANNING APPARATUS
Filed May 29, 1931     2 Sheets-Sheet 2
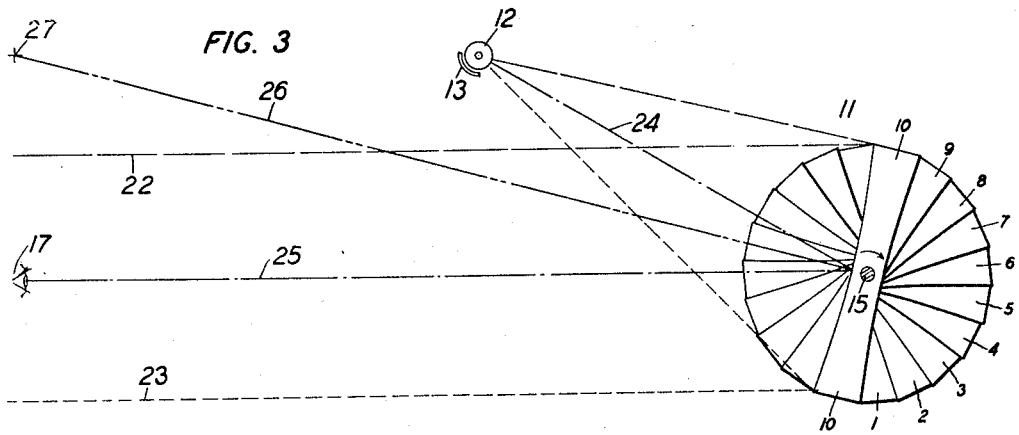
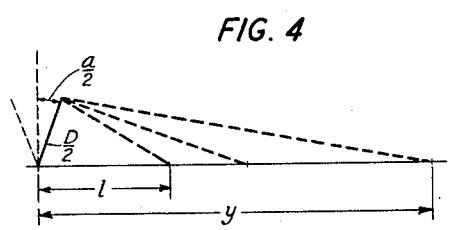
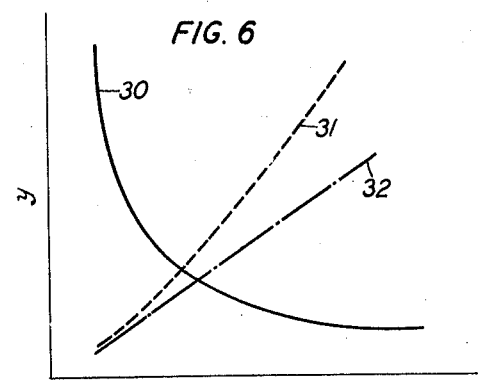
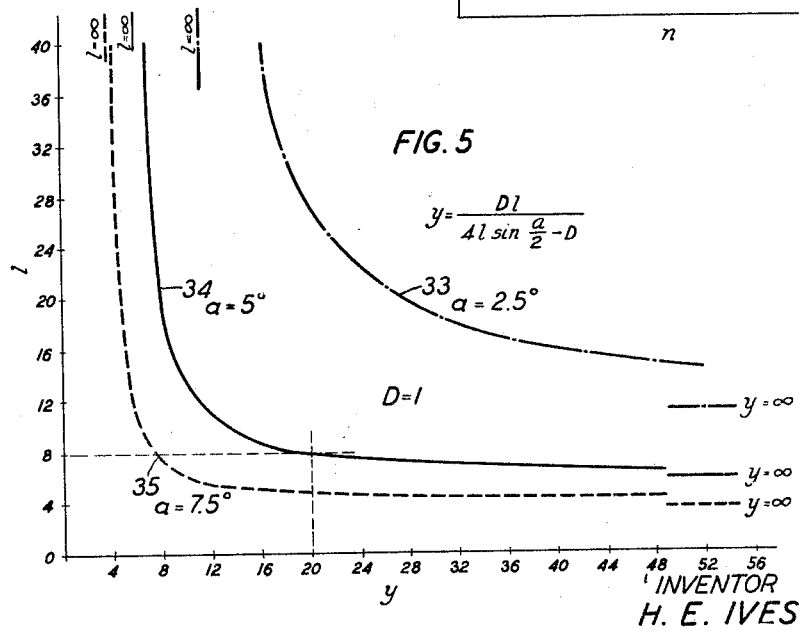
INVENTOR
H. E. IVES
BY
Stanley B. Kent
ATTORNEY Patented June 26, 1934

1,964,580

UNITED STATES PATENT OFFICE 1,964,580

SCANNING APPARATUS

Herbert E. Ives, Montclair, N. J., assignor to Bell Telephone Laboratories, Incorporated, New York, N. Y., a corporation of New York Application May 29, 1931, Serial No. 540,835

13 Claims. (Cl. 178—6)

This invention relates to electro-optical systems and more particularly to television receiving systems.

An object of the invention is to provide an improved arrangement for direct viewing of television images with a mirror helix.

A feature of the invention is an arrangement comprising a strip source of diffuse light associated with a mirror helix in such a way that the light source may be located closer to the helix than in previous arrangements of this same general character known to applicant. This is accomplished by using an optical system to reduce the spreading of the reflected rays in vertical planes on the assumption that the axis of rotation of the mirror helix is horizontal. The axis of rotation, however, need not be horizontal, but for reference purposes it is so considered in this specification.

Another feature of the invention is a television receiving arrangement in which a half turn mirror helix is used, both long edges of each mirror strip being reflecting.

In one arrangement illustrative of the invention a mirror helix is used which is composed of thin, elongated, flat strips of metal mounted on a rotatable shaft with the flat faces adjacent one another, successive strips being equally angularly displaced through 180 degrees. Both long edges of each strip are polished to form a plane mirror surface. A convex cylindrical lens is placed close to the mirror helix with its axis parallel to the axis of rotation of the helix and a strip source of light is placed approximately at the principal focus of this lens. As the helix is rotated about a horizontal axis, beams of light from the source composed of rays parallel in vertical planes are swept across a given point in space by successive mirror faces. If the source is energized by television image currents, an eye positioned at such a point and looking at the mirror helix sees a television image as though looking at it through a window. A complete image is built up for each half revolution of the helix and the opposite mirror faces become alternately effective.

In another illustrative arrangement, a result similar to that effected by the use of a convex lens, is accomplished by making the reflecting edges of the mirror strips concave cylindrical, the axis of the concave surface lying parallel to the axis of rotation of the helix.

A more detailed description of the invention follows having reference to the accompanying drawings.

Fig. 3 is a side view of a modified form of the invention using concave cylindrical mirror surfaces.

Figs. 4, 5 and 6 are diagrams used in explaining the invention.

Like reference characters are used to designate similar elements in the several figures.

Figure 1:
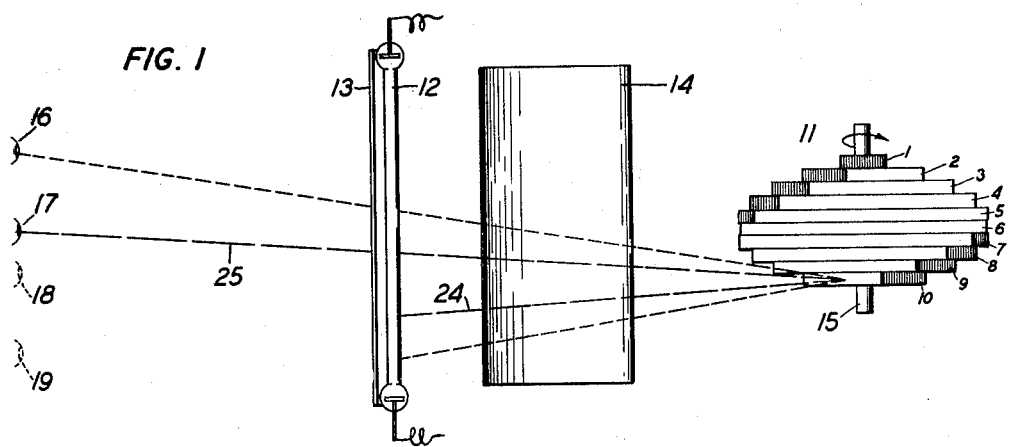
Fig. 1 is a plan view of one form of the invention using a convex cylindrical lens and plane mirror surfaces.
Figure 2:
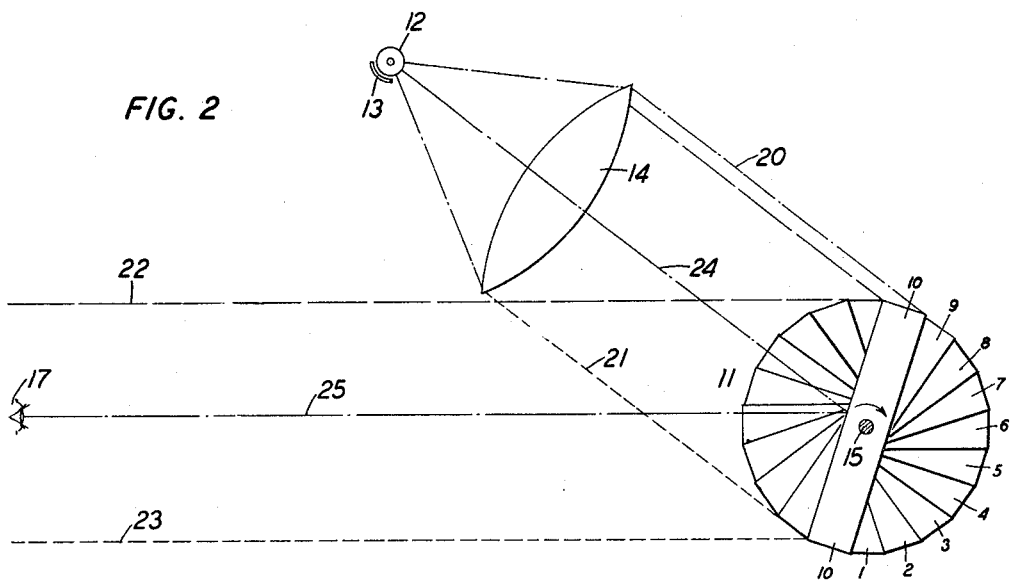
Fig. 2 is a side view of the arrangement of Fig. 1.

Referring now to Figs. 1 and 2, a mirror helix 11 consists of thin, elongated strip members 1 to 10 inclusive, mounted on a shaft 15 and equally angularly displaced from one another to form a half turn helix. The shaft is inserted in aligned holes symmetrically located in the several strips. The strips in their displaced positions are secured to the shaft in any suitable manner so that the assembly may be rotated as a unit. Each long edge of each strip is polished to form a plane mirror surface. The ends of the strips are painted a dead black to absorb as much light as possible. A cylindrical lens 14 with its axis parallel to the axis of rotation of the mirror helix is placed as near to the helix as possible without interfering with the observer's view of the helix. A strip light source 12, which is preferably in the form of a tubular gaseous discharge lamp, is located approximately at the principal focus of the lens 14 preferably a little closer to the lens than is the principal focus. Eyes 16 to 19 positioned laterally of the mirror helix at suitable positions receive light rays reflected from the mirror faces successively. The eyes are shielded from direct rays from the lamp 12 by the shield 13.

Since the light source is located at the principal focus of the lens 14 the emerging beam consists of rays which are parallel in vertical planes, the axis of rotation of the mirror helix being horizontal. The boundary rays of such a beam are illustrated by broken lines 20 and 21 in Fig. 2. A portion of this beam is reflected by the mirror faces in succession as the mirror helix rotates. The reflected beam also consists of rays which are parallel in vertical planes. The boundary rays of such a beam reflected from the left hand face of element 10 in the position shown in Fig. 2 is represented by broken lines 22 and 23. This beam of parallel rays is swept across the eye 17 as the mirror helix rotates, the point of reflection of the rays which enter the eye 17 moving from the upper end of element 10 toward the lower end. The elemental beam which enters the eye 17 for the position of element 10 shown in Fig. 2, is represented by the broken lines 24 and 25.

Eyes 16 and 17 represent the two eyes of an observer viewing the helix 11. As the helix rotates the reflected rays which enter these eyes come from the several strips successively and from opposite faces of each strip alternately. The light source 12 and the lens 14 are each longer than the length of the mirror helix along its axis of rotation in order that reflected light from each of the mirror faces may be viewed by an eye in any given position and light may be viewed from a plurality of positions represented by the eyes 16 to 19 inclusive.

The light source 12 is preferably energized by television image currents. If the incoming currents are properly synchronized with the rotation of the mirror helix, television images are seen as though looking through a window outlining the space occupied by the mirror helix.

Due to the use of the lens 14 and the light source positioned at its principal focus the observer may be positioned closer to the mirror helix and still have rays reflected from all portions of the helix enter his eyes. Likewise, for a given position of the observer, the light source may be located much closer to the mirror helix than as though the lens 14 were not used.

Referring now to Fig. 3, this arrangement is similar to that of Figs. 1 and 2 except that the lens 14 has been omitted and the reflecting faces of the elements 1 to 10 inclusive are made concave cylindrical surfaces. The radius of curvature is represented by line 26, the center of curvature being at point 27. For the position of element 10 shown in Fig. 3 the reflected beam is composed or rays which are parallel in vertical planes, the axis of rotation of the mirror helix being horizontal. The boundary rays of this beam are represented by broken lines 22 and 23. As the mirror helix rotates in the direction shown by the arrows this beam is swept across the observer's eye 17. The particular elemental beam which enters the eye 17 is represented by broken lines 24 and 25. As the beam from element 10 leaves the viewing field, similar beams from the other elements become effective successively.

The plan view of the arrangement of Fig. 3 is identical with that of Fig. 1 except that the lens 14 is omitted.

In the arrangement of Fig. 3 the light source 12 may also be located closer to the mirror helix 11 for a given position of the observer's eye 17 than as though the reflecting surfaces were plane mirrors.

The reason for the advantages of the present invention will now be pointed out in greater detail by reference to Figs. 4, 5 and 6. An understanding of these figures will also be of assistance in the design and construction of apparatus embodying this invention.

Because of the fact that the linear light source 12 and mirror helix 11 must of necessity be at different distances from the eyes of the observer, it results that there is only one viewing distance for each position of the lamp in which the rectangular projection of the rotating helix is exactly filled from one side to the other. This distance is, of course, a function of the length of the mirror strips and of the angle between them. In Fig. 4 there is shown a construction for determining the distances in question on the assumption that the light source 12 and the eye of the observer 17 are in the same straight line, that no light deviating device is used between the light source and the helix, and that the helix has plane mirror surfaces. In practice the light source and the eye must have sufficient angular separation to clear each other as shown in Figs. 2 and 3 and this will introduce minor modifications in the result. Representing the distance from the helix to the eye by $y$, from the helix to the lamp by $l$, the length of the mirror strip by $D$, and the angle between adjacent mirror strips by $a$, the following relation holds $$y = \frac{Dl}{4l \sin \frac{a}{2} - D}$$

This relation is shown plotted as curves 33, 34 and 35 in Fig. 5 for the special case of a mirror length of unity ($D=1$) and for angles between the strips of 2.5 degrees, 5 degrees, and 7.5 degrees, respectively, corresponding to 144, 72 and 48 scanning strips in a full turn helix. These curves which are of parabolic form, take positions successively further from the origin as the number of scanning strips is increased with consequent decrease in the angle $a$. For a distance between the light source and the helix of 8 feet, the plot (curve 34) shows that the observing distance for a 72 line (square) should be 20 feet.

This observing distance is much greater than is required in order to see a practically structureless picture. In any structured picture there is a minimum viewing distance at which satisfactory results can be obtained fixed by the size of the structure. The smaller the structure the shorter the distance from which the picture may be viewed. With the mirror helix a set of conflicting conditions exists. As the angle between the strips is decreased the observing distance must be increased in order that the frame can be filled. On the other hand, as the number of strips is increased, the observing distance for properly utilizing the number of strips used is decreased. As a consequence there comes a point, where increasing the number of scanning strips and the detail of the image, becomes of no value because of the greater distance to which the observer is forced. The practical problem, therefore, becomes that of making the observing distance at which the frame is filled, at least as small as the distance which the picture structure would make possible.

The general relationship between the number of scanning strips $n$, and the observing distance $y$, is obtained as follows:

The width of a strip for a square frame will be $$\frac{D}{n}$$

The angle $e$ subtended is given by the relation $$\frac{\frac{D}{n}}{y} = 2 \tan \frac{1}{2} e$$

Since $e$ is quite small $$y = \frac{D}{ne}$$

The relationship is parabolic, as shown by full line 30 in Fig. 6. Now the observing distance, in order that the frame may be just filled $$y = \frac{Dl}{4l \sin \frac{a}{2} - D}$$

may also be expressed in terms of $n$, for if $a$ is small we have $$\sin \frac{a}{2} = \frac{a}{2} = \frac{\frac{2\pi}{n}}{2} = \frac{\pi}{n}$$

so that $$y = \frac{nD}{4\pi - \frac{nD}{l}}$$

This relation is represented by the dashed line 31 in Fig. 6, which is one of a family for different values of $l$. For the special case of $l=\infty$ (attained by using a lens between the light and the mirror helix, as shown in Figs. 1 and 2)

$$y = \frac{nD}{4\pi}$$

represented by the dot and dash line 32 of Fig. 6. The points where the full curve 30 and the dashed lines 31 and 32 cross represent combinations of a number of strips and observing distances which cannot be far deviated from for efficient results. The dashed lines 31 and 32 in the Fig. 6 correspond to an assumed angular width of the mirror strip as viewed. The practical figure for this width is a matter of experimental determination. In a mirror helix in which the strips are 1/72 of a foot in width, the screen may be viewed at a distance of approximately 8 to 10 feet with satisfactory results corresponding to an angular extent of about five minutes of arc. Once this figure has been determined it is possible to find the limitations as to the number of strips viewed, distances, etc. by the use of the formulæ given. This distance of 10 feet, as shown by curve 34 in Fig. 5, corresponds to the impractically large distance of 13 feet for the separation of the light source from the helix. Fig. 5 shows that if the light source can be removed to infinite distance, the observing distance can be reduced for the case given, to approximately the minimum distance found experimentally for the 72 line picture to appear practically structureless. One method of doing this is to place a large convex lens close to the helix as illustrated in Figs. 1 and 2.

A practical limitation to the use of a lens is that it magnifies the image of the light source as seen by an observer. If $d$ is distance between the lens and the light source and $y$ is the distance between the lens and the eye, the light source will be magnified in the ratio of $$\frac{d+y}{d}$$

This magnification may amount to three or four times under the conditions just considered. It will therefore be necessary to take care that the line light source is narrow enough to appear no wider than the width of the mirror strips when the lens is used.

Another way of utilizing this idea is that illustrated in Fig. 3 where the reflecting faces of the mirror helix are made concave cylindrical.

In the arrangements illustrated, opposite edges of each strip are made mirror reflecting. The advantage of reduced distance between the light source and helix and between the observer and helix may be obtained when only one long edge of each strip is made reflecting providing a full turn helix is used.

From the curves of Fig. 5 it is obvious that the use of a convex lens or concave mirror surfaces to enable locating the light source close to the helix, is particularly advantageous with with the type of helix having opposite edges reflecting. Since, for a given number of strips, the angle between strips is necessarily reduced in the half turn helix over that of the full turn helix, this would normally require the observer to be at a greater distance from the helix when only a half turn is used, but this condition is somewhat overcome by the use of the lens or concave mirror surfaces in accordance with this invention.

A mirror helix with only ten strips has been used for illustration to simplify the drawing. In any practical arrangement a much larger number of strips would be used, as has already been indicated hereinbefore, but it is not necessary to illustrate such larger number in the drawing for a complete understanding of the invention.

What is claimed is:

1. A television receiving system comprising a rotatable mirror helix having a plurality of elongated mirrors helically positioned about the axis of rotation and arranged to be viewed directly, a strip source of diffuse light positioned laterally of said helix and having considerable extent in a direction parallel to said axis, and optical means including the reflecting faces of said mirrors successively for gathering a beam of rays from said source to form a reflected beam more concentrated in a direction transverse to the axis of rotation than the gathered beam.

2. In an electro-optical system, a mirror helix, a strip source of diffuse light, and a lens arranged to project a beam of light from said source on said helix, the rays of which beam lying in planes perpendicular to the axis of rotation of said helix are substantially parallel.

3. A television receiving system comprising a rotatable mirror device composed of a plurality of rectangular strips mounted upon a shaft and angularly progressively displaced with respect to each other, an edge of each strip having a mirror surface whereby said surfaces are helically arranged about the axis of rotation of said device, a strip light source positioned laterally of said device and substantially parallel to said axis of rotation, means to gather rays from said source and concentrate them upon said mirror surfaces, and means for impressing television image currents upon said strip light source.

4. In an electro-optical system, a rotatable mirror helix comprising a plurality of elongated plane mirrors helically positioned about the axis of rotation, a convex lens positioned laterally of said mirror helix, and a strip source of diffuse light positioned approximately at the principal focus of said lens on the side opposite to said helix and substantially parallel to the axis of rotation of said helix.

5. In an electro-optical system, a rotatable mirror helix comprising a plurality of elongated plane mirrors helically positioned about the axis of rotation, a convex cylindrical lens positioned laterally of said helix with the axis of the lens parallel to the axis of rotation, and a strip source of diffuse light positioned approximately at the principal focus of said lens on the side opposite to said helix.

6. In an electro-optical system, a rotatable mirror helix comprising a plurality of pairs of elongated plane mirrors helically positioned about the axis of rotation, the mirrors of each pair being symmetrically located with respect to said axis, a convex lens positioned laterally of said mirror helix, and a strip source of diffuse light positioned approximately at the principal focus of said lens on the side opposite to said helix and parallel to the axis of rotation of said helix.

7. In an electro-optical system, a rotatable mirror helix comprising a plurality of pairs of elongated plane mirrors helically positioned about the axis of rotation, the mirrors of each pair being symmetrically located with respect to said axis, a convex cylindrical lens positioned laterally of said mirror helix with the axis of said lens substantially parallel to the axis of rotation of said helix, and a strip source of diffuse light positioned approximately at the principal focus of said lens on the side opposite to said helix and substantially parallel to the axis of rotation of said helix.

8. In an electro-optical system, a rotatable mirror helix comprising a plurality of sets of elongated plane mirrors helically positioned about the axis of rotation, the mirrors of each set being symmetrically located with respect to said axis, a convex lens positioned laterally of said mirror helix, and a strip source of diffuse light positioned approximately at the principal focus of said lens on the side opposite said helix and substantially parallel to the axis of rotation of said helix.

9. In a television receiving system, a rotatable mirror helix having a plurality of elongated concave reflecting surfaces helically positioned about the axis of rotation and arranged to be viewed directly by an observer, the axis of each concave surface lying in a plane parallel to said axis of rotation, and an elongated source of diffuse light positioned laterally of said surfaces and having considerable extent in a direction parallel to said axis.

10. In an electro-optical system, a rotatable mirror helix having a plurality of elongated concave reflecting surfaces helically positioned about the axis of rotation, the axis of each concave surface being parallel to said axis of rotation, and an elongated source of diffuse light positioned laterally of said surfaces, parallel to said axis of rotation and closer to the reflecting surfaces than half the radius of each concave surface.

11. In an electro-optical system, a rotatable mirror helix having a plurality of pairs of concave reflecting surfaces helically positioned about the axis of rotation, the surfaces of each pair being symmetrically located with respect to said axis and the axis of each concave surface being parallel to the axis of rotation, and an elongated source of diffuse light positioned laterally of said surfaces and substantially parallel to said axis of rotation.

12. In an electro-optical system, a rotatable mirror helix having a plurality of sets of concave reflecting surfaces helically positioned about the axis of rotation, the surfaces of each set being symmetrically located with respect to said axis and the axis of each concave surface being parallel to the axis of rotation, and an elongated source of diffuse light positioned laterally of said surfaces and substantially parallel to said axis of rotation.

13. In an electro-optical system, a strip source of diffuse light, means to successively reflect beams of light from said source to sweep across a given point in space, the portions of said beams composed of the rays passing through said point being of elemental thickness and having reflected rays less divergent than the incident rays in planes parallel to the boundary planes of said portions, and means to energize said source with television image currents.

HERBERT E. IVES.